United States Patent
Song et al.

(10) Patent No.: US 9,082,064 B2
(45) Date of Patent: *Jul. 14, 2015

(54) THUMBNAIL CREATION METHOD AND IMAGE FORMING APPARATUS

(75) Inventors: Woo-yeal Song, Seoul (KR); Haeng-nan Kim, Suwon-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 506 days.

This patent is subject to a terminal disclaimer.

(21) Appl. No.: 12/547,725

(22) Filed: Aug. 26, 2009

(65) Prior Publication Data

US 2010/0122216 A1 May 13, 2010

(30) Foreign Application Priority Data

Nov. 12, 2008 (KR) .................. 10-2008-0112202

(51) Int. Cl.
*G06F 3/00* (2006.01)
*G06K 15/02* (2006.01)
*G06F 3/12* (2006.01)

(52) U.S. Cl.
CPC .......... *G06K 15/1811* (2013.01); *G06F 3/1205* (2013.01); *G06F 3/1242* (2013.01); *G06F 3/1246* (2013.01); *G06F 3/1258* (2013.01); *G06F 3/1285* (2013.01); *G06K 15/02* (2013.01); *G06K 15/1848* (2013.01)

(58) Field of Classification Search
CPC .............. G06F 3/04817; G06F 17/212; G06F 17/30994; H04N 1/0044; H04N 1/00442; H04N 1/00456; H04N 2201/325; G06T 11/60; G06T 3/40; G06T 9/00

USPC .................................................. 715/838, 274
See application file for complete search history.

(56) References Cited

U.S. PATENT DOCUMENTS

| 7,487,175 | B2 * | 2/2009 | Yoshida et al. ................... 1/1 |
| 7,844,918 | B1 * | 11/2010 | Ashe .............................. 715/838 |
| 7,864,347 | B2 * | 1/2011 | Moran et al. .................. 358/1.13 |
| 7,916,332 | B2 | 3/2011 | Kato |
| 8,332,745 | B2 | 12/2012 | Takahashi |
| 2002/0052974 | A1 * | 5/2002 | Saito ............................. 709/247 |
| 2005/0114386 | A1 * | 5/2005 | Nassor et al. ................. 707/102 |
| 2006/0087668 | A1 | 4/2006 | Takahashi |
| 2006/0133670 | A1 * | 6/2006 | Barrus et al. ................... 382/173 |
| 2006/0165459 | A1 * | 7/2006 | Ishii .............................. 400/62 |

(Continued)

FOREIGN PATENT DOCUMENTS

| CN | 1992776 | 7/2007 |
| CN | 101179732 | 5/2008 |

(Continued)

OTHER PUBLICATIONS

Chinese Office Action dated Jun. 3, 2013 issued in CN Application No. 200910173054.7.

(Continued)

*Primary Examiner* — Ryan Pitaro
(74) *Attorney, Agent, or Firm* — Staas & Halsey LLP (57) ABSTRACT

A thumbnail creation method is provided, which includes receiving a selection of an XPS file, analyzing a structure of the XPS file, creating a thumbnail image representing the XPS file according to the analyzed structure, and adding the created thumbnail image to the XPS file. Therefore, it is possible for a user to easily add thumbnails to the XPS file.

21 Claims, 8 Drawing Sheets

(56) References Cited

U.S. PATENT DOCUMENTS

| | | | |
|---|---|---|---|
| 2006/0224937 A1* | 10/2006 | Sudoh et al. | 715/500 |
| 2006/0230362 A1* | 10/2006 | Matsusaka | 715/838 |
| 2006/0236237 A1* | 10/2006 | Peiro et al. | 715/530 |
| 2006/0238810 A1* | 10/2006 | Fukudome | 358/1.16 |
| 2006/0291017 A1* | 12/2006 | Moran et al. | 358/538 |
| 2007/0061579 A1* | 3/2007 | De Mello et al. | 713/176 |
| 2007/0094615 A1* | 4/2007 | Endo et al. | 715/838 |
| 2007/0146790 A1 | 6/2007 | Park | |
| 2007/0203948 A1 | 8/2007 | Yoshida et al. | |
| 2008/0024802 A1 | 1/2008 | Kato | |
| 2008/0115089 A1 | 5/2008 | Lee et al. | |
| 2008/0130053 A1* | 6/2008 | Okamoto | 358/1.17 |
| 2008/0151294 A1* | 6/2008 | Natori et al. | 358/1.15 |
| 2008/0178067 A1* | 7/2008 | Lahman et al. | 715/200 |
| 2008/0209363 A1* | 8/2008 | Kuroda | 715/838 |
| 2008/0244093 A1* | 10/2008 | Hara | 709/247 |
| 2008/0252943 A1* | 10/2008 | Kozakura et al. | 358/474 |
| 2008/0288894 A1* | 11/2008 | Han et al. | 715/855 |
| 2009/0113278 A1* | 4/2009 | Denoue et al. | 715/201 |
| 2009/0235155 A1* | 9/2009 | Ueda | 715/233 |
| 2009/0254529 A1* | 10/2009 | Goldentouch | 707/3 |
| 2009/0292723 A1* | 11/2009 | Levin et al. | 707/102 |
| 2009/0307626 A1* | 12/2009 | Jalon et al. | 715/771 |
| 2010/0115389 A1* | 5/2010 | Gautestad | 715/205 |
| 2010/0134841 A1* | 6/2010 | Petz | 358/1.15 |
| 2011/0267651 A1* | 11/2011 | Chiba | 358/1.15 |
| 2012/0224190 A1 | 9/2012 | Yoshida et al. | |

FOREIGN PATENT DOCUMENTS

| | | |
|---|---|---|
| JP | 2003-196638 | 7/2003 |
| JP | 2006-119915 | 5/2006 |
| JP | 2007-230068 | 9/2007 |
| JP | 2008-33812 | 2/2008 |
| JP | 2008-125026 | 5/2008 |

OTHER PUBLICATIONS

Korean Office Action dated Oct. 30, 2013 issued in KR Application No. 10-2008-0112202.

Japanese Office Action dated Jan. 7, 2014 issued in JP Application No. 2009-252911.

Nagatomo Mari, Acrobat basic lesson-latter part, Using PDF, Nikkei Pasocon, Sep. 6, 1999, Japan, Nikkei BP, Sep. 1999, vol. 344, pp. 166-173.

European Search Report Issued on Sep. 2, 2012 in EP Patent Application No. 09169210.3.

Dona Baker: "Configuring the page pane in 1-15 Acrobat", Planet PDF, Apr. 22, 2004, XP55038677, Retrieved from the Internet: URL:http://www.planetpdf.com/enterprise/article.asp?ContentID=configuring_the_pages_pane_in_&gid=6115 [retrieved on Sep. 19, 2012].

"PDF Embedded thumbnails", Nov. 25, 2008, XP55038675, Retrieved from the Internet: URL: http://www.b4print.com/index.php?topic=2690.0 [retrieved on Sep. 19, 2012].

Korean Office Action issued Oct. 10, 2014 in corresponding Korean Patent Application No. 10-2008-0112202.

* cited by examiner

```
<?xml version="1.0" encoding="utf-8"?>
<Relationships xmlns="http://schemas.openxmlformats.org/package/2006/relationships">
<Relationship Target="/FixeDocumentSequence.fdseq" Id="R0"
Type="http://schemas.microsoft.com/xps/2005/06/fixedrepresentation"/>
<Relationship Target="/Documents/1/Metadata/Page1_Thumbnail.JPG" Id="R1"
Type="http://schemas.openxmlformats.org/package/2006/relationships/metadata/thumbnail"/>
</Relationships>
```

FIG. 4

```
<?xml version="1.0" encoding="utf-8"?>
<Relationships xmlns="http://schemas.openxmlformats.org/package/2006/relationships">
<Relationship Type="http://schemas.microsoft.com/xps/2005/06/required-resource" Target="/Resources/courier.ttf" Id="Q0"/>
</Relationships>
```

THUMBNAIL CREATION METHOD AND IMAGE FORMING APPARATUS

CROSS-REFERENCE TO RELATED APPLICATIONS

This application claims priority under 35 U.S.C. §119(a) from Korean Patent Application No. 10-2008-0112202, filed on Nov. 12, 2008, in the Korean Intellectual Property Office, the disclosure of which is incorporated herein by reference in its entirety.

BACKGROUND

1. Field of the Invention

The present general inventive concept relates to a thumbnail creation method and an image forming apparatus. More particularly, the present general inventive concept relates to a thumbnail creation method to easily add thumbnails to an XML paper specification (XPS) file when there is no thumbnail in the XPS file, and an image forming apparatus.

2. Description of the Related Art

Image forming apparatuses generally print print data generated by terminal devices, such as computers, onto recording media. Examples of such image forming apparatuses include copiers, printers, facsimile machines or multifunction peripherals (MFPs) which combine functions of copiers, printers and facsimile machines in a single system.

Image forming apparatuses which have been widely used in recent years support a direct printing function to print document data, such as Portable Document Format (PDF) data, Tagged Image File Format (TIFF) data or Joint Photographic Experts Group (JP(E)G) format data. Such a direct printing function enables direct printing by merely transmitting a file to an image forming apparatus without needing to launch an additional application program in a terminal device, such as a personal computer (PC), a laptop, a personal digital assistant (PDA) or a digital camera.

The direct printing function is applicable to an XML paper specification (XPS) file. An XPS file has a fixed-layout electronic file format that preserves document formatting and can be shared, and is a zip-formatted file which includes all kinds of data and resources described by systematizing all resources required for documents or jobs in a directory structure and by writing the references therebetween in XML (extensible markup language). Such an XPS file has a logical structure in the form of a tree having a plurality of levels, as illustrated in FIG. 1.

Figure 1:
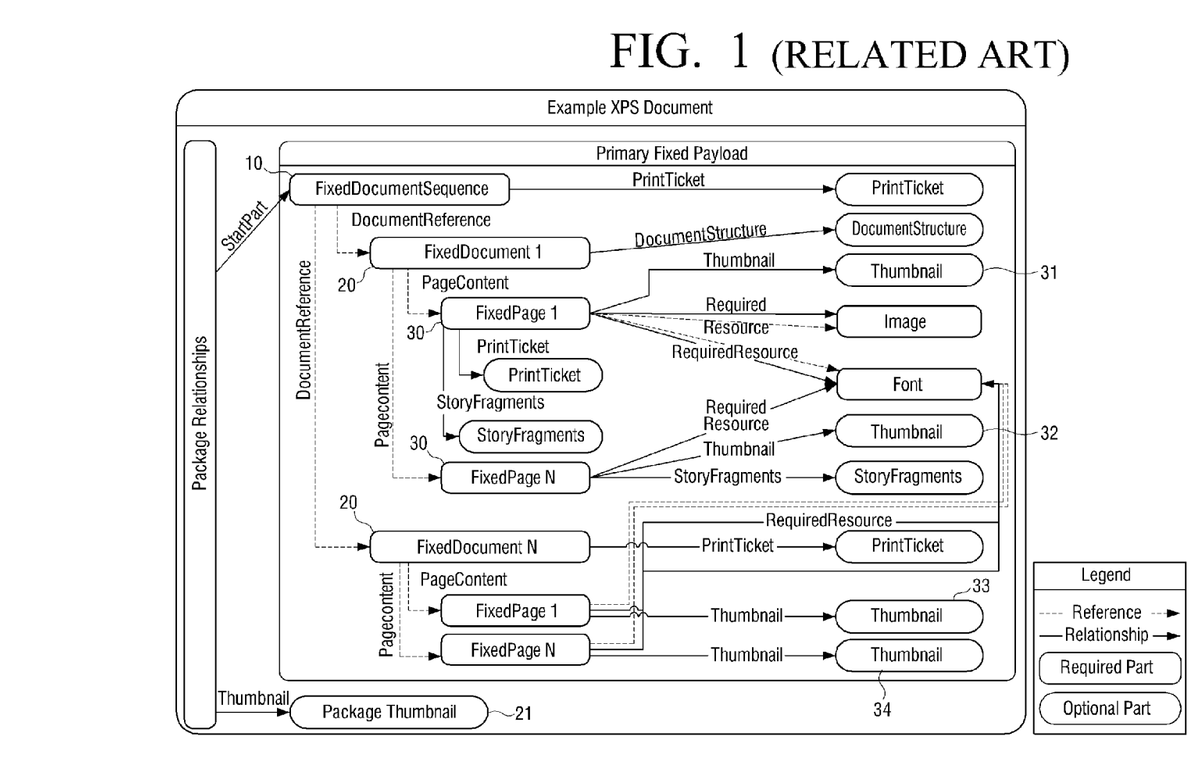
FIG. 1 exemplarily illustrates a logical structure of an XML paper specification (XPS) file.

Referring to FIG. 1, an XPS file is represented with a job level, a document level and a page level located in a hierarchical branching structure. The document level includes a plurality of documents, and the page level includes a plurality of pages. Different print options may be set for each of the plurality of documents and for each of plurality of pages. Additionally, the XPS file contains thumbnails representing each of the plurality of documents and each of the plurality of pages.

However, a conventional image forming apparatus is unable to support a function of adding thumbnails to an XPS file when the XPS file does not have thumbnails. Additionally, a user needs to modify various images in the XPS file in order to add thumbnails to the XPS file, when using a terminal device such as a PC. Therefore, there is a need for methods to easily add thumbnails to the XPS file.

SUMMARY

The present general inventive concept provides a thumbnail creation method to analyze a structure of an XML paper specification (XPS) file and to easily add thumbnails to the XPS file when there is no thumbnail in the XPS file, and an image forming apparatus.

Additional features and utilities of the present general inventive concept will be set forth in part in the description which follows and, in part, will be obvious from the description, or may be learned by practice of the general inventive concept.

Exemplary embodiments of the present general inventive concept may be achieved by providing a thumbnail creation method including receiving a selection of an XML paper specification (XPS) file, analyzing a structure of the XPS file, creating a thumbnail image representing the XPS file according to the analyzed structure, and adding the created thumbnail image to the XPS file.

The analyzing of the structure of the XPS file may include analyzing a structure of a job region, a document region and a page region in the XPS file, and checking whether or not thumbnail information is contained in the job region, the document region and the page region.

The receiving of the selection of the XPS file may include, determining that the XPS file is selected when at least one of an XPS file print command and a thumbnail creation command is received.

The thumbnail creation method may further include, displaying a notification that there is no thumbnail information when the XPS file does not contain thumbnail information.

The displaying of the notification may include displaying the notification that there is no thumbnail information with a user interface window having a first field to display whether or not thumbnails exist for the job region, the document region and the page region in the XPS file, and a second field to receive a selection of whether to create thumbnails respectively representing the job region, the document region and the page region.

The creating of the thumbnail image may include creating a thumbnail image representing a region from a received selection.

The creating of the thumbnail image may include creating at least one thumbnail image representing at least one of all regions of the XPS file, all document regions of the XPS file and all page regions of the XPS file.

The creating of the thumbnail image may include creating a thumbnail image using rendered data corresponding to a document region and page region represented by the thumbnail image or print data corresponding to the document region and page region represented by the thumbnail image.

The creating of the thumbnail image may include reducing the rendered data or the print data to a predetermined size and creating a thumbnail image.

The thumbnail creation method may further include storing the XPS file to which the thumbnail image is added.

Exemplary embodiments of the present general inventive concept may be achieved by providing an image forming apparatus including a user interface to receive a selection of an XML paper specification (XPS) file, an analyzer to analyze a structure of the XPS file, a thumbnail creator to create a thumbnail image representing the XPS file according to the analyzed structure, and a controller to add the created thumbnail image to the XPS file.

The analyzer may analyze a structure of a job region, a document region and a page region in the XPS file, and may check whether thumbnail information is contained in the job region, the document region and the page region.

The user interface may determine that the XPS file is selected when at least one of an XPS file print command and a thumbnail creation command is received.

The user interface may display a notification that there is no thumbnail information when the XPS file does not contain thumbnail information.

The user interface may display the notification that there is no thumbnail information with a user interface window having a first field to display whether or not thumbnails exist for the job region, the document region and the page region in the XPS file, and a second field to receive a selection of whether to create thumbnails respectively representing the job region, the document region and the page region.

The thumbnail creator may create a thumbnail image representing a region from a received selection.

The thumbnail creator may create at least one thumbnail image representing at least one of all regions of the XPS file, all document regions of the XPS file and all page regions of the XPS file.

The thumbnail creator may create a thumbnail image using rendered data corresponding to a document region and a page region represented by the thumbnail image or print data corresponding to the document region and page region represented by the thumbnail image.

The thumbnail creator may reduce the rendered data or the print data to a predetermined size and create a thumbnail image.

The image forming apparatus may further include a storage unit to store the XPS file to which the thumbnail image is added.

The image forming apparatus may further include a communication interface to transmit the XPS file to which the thumbnail image is added.

Exemplary embodiments of the present general inventive concept may also be achieved by providing a thumbnail creation method including receiving a selection of an XML paper specification (XPS) file, receiving a thumbnail creation command, analyzing a structure of the XPS file, and creating a thumbnail image representing the XPS file according to the analyzed structure and the thumbnail creation command.

The method may also include adding the created thumbnail image to the XPS file.

The method may also include storing the XPS file to which the thumbnail image is added.

Exemplary embodiments of the present general inventive concept may also be achieved by providing an image forming apparatus, including a user interface to receive a selection of an XML paper specification (XPS) file and a thumbnail creation command, an analyzer to analyze a structure of the XPS file, and a thumbnail creator to create a thumbnail image representing the XPS file according to the analyzed structure and the received thumbnail creation command.

The image forming apparatus may further include a controller to add the created thumbnail image to the XPS file.

The image forming apparatus may further include a communication interface to transmit the XPS file having the added thumbnail image.

The image forming apparatus may further include a digital storage device to store the XPS file to which the thumbnail image is added.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
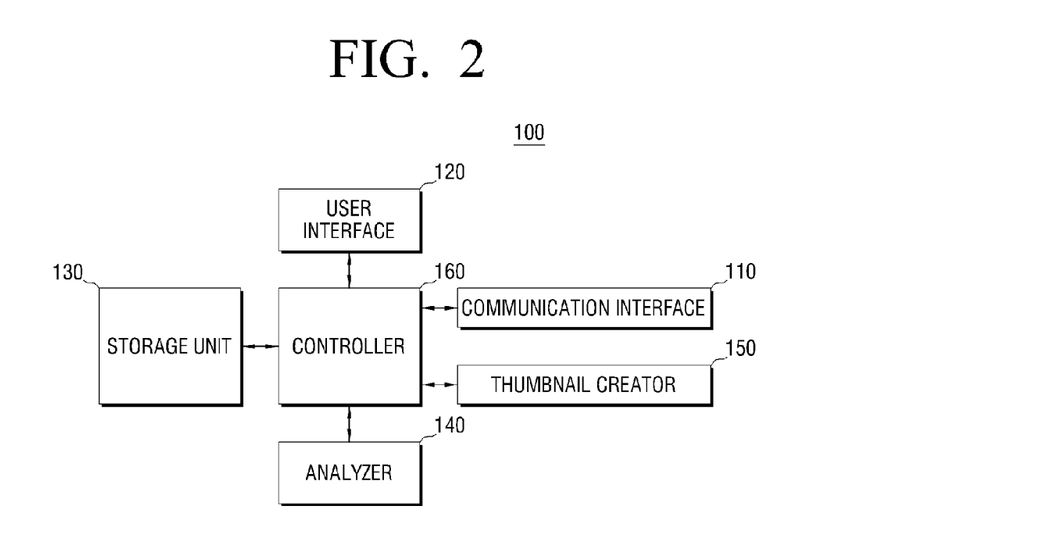
FIG. 2 is a block diagram illustrating an image forming apparatus according to exemplary embodiments of the present general inventive concept.

FIG. 2 is a block diagram illustrating an image forming apparatus 100 according to an exemplary embodiment of the present general inventive concept. The image forming apparatus 100 illustrated in FIG. 2 includes a communication interface 110, a user interface 120, a storage unit 130, an analyzer 140, a thumbnail creator 150 and a controller 160.

The communication interface 110 may be connected to a terminal device (not illustrated), such as a personal computer (PC), a laptop, a personal digital assistance (PDA) or a digital camera, to receive an XML paper specification (XPS) file. In more detail, the communication interface 110 is configured to connect the image forming apparatus 100 with an external apparatus. The communication interface 110 may access the terminal device via a local area network (LAN), an Internet network, or using a universal serial bus (USB) port, or with any other suitable wired or wires communication path. Additionally, the communication interface 110 may receive an XPS file using a direct printing method, or from a storage medium such as a USB memory through a USB port, or from any other digital storage device.

The XPS file, as described above, refers to print data to which print options are set, and which is represented in the form of a tree structure having a plurality of levels. Specifically, the XPS file has a plurality of levels, each of which has one or more nodes, and different print options may be set for each node of the plurality of levels. Additionally, the XPS file contains thumbnails representing each document and each page. For example, referring to FIG. 1, an XPS file is represented as having a job level 10, a document level 20 and a page level 30 located in a hierarchical branching structure. A region that is located in or hierarchically below the job level 10 may be referred to as the job region, a region that is located in or hierarchically below the document level 20 may be referred to as the document region, and a region located in or hierarchically below the page level 30 may be referred to as the page region. The XPS file of FIG. 1 contains a package thumbnail 21 corresponding to a job region, and thumbnails 31, 32, 33, 34 corresponding to each page region.

The user interface 120 includes a plurality of function keys through which a user is able to set or select various functions supported by the image forming apparatus 100. The user interface 120 receives a user command to print the XPS file and a user command to create thumbnails for the XPS file, or displays a variety of information provided by the image forming apparatus 100. The user interface 120 may be implemented as an apparatus such as a touch pad, where both input and output can be implemented, or as an apparatus combining a mouse or other user-input device and a monitor. A user may select an XPS file to which he or she desires to add thumbnails, using a user interface window provided by the user interface 120. Additionally, the user may access a variety of thumbnail information contained in the XPS file, and may select a job region, a page region or a document region of the XPS file in order to add corresponding thumbnails.

The storage unit 130 stores an XML file. The storage unit 130 may be implemented as a storage medium built in the image forming apparatus 100, or as an external storage medium to be coupled to the image forming apparatus 100. For example, the storage unit 130 may be a removable disk including a USB memory, a storage medium connected to a host device, or a web server connected via a network, or any other suitable storage device.

The analyzer 140 analyzes a structure of an XPS file. Specifically, the analyzer 140 determines whether or not thumbnail information is contained in each job region, each document region and each page region in the XPS file.

An XPS file, as described above, refers to a zip-formatted file which includes all kinds of data and resources described by systematizing all resources required for documents or jobs in a directory structure. Accordingly, when the XPS file is decompressed, thumbnail images representing each job region, each document region and each page region are stored in corresponding resource folders in a Portable Network Graphics (PNG) or Joint Photographic Experts Group (JP(E)G) file format. Additionally, relationship files (.fdoc or .fpage) in which thumbnail information regarding the thumbnail images is written are stored in directories corresponding to each job region, each document region and each page region.

A relationship file refers to a file containing thumbnail information associated with each job region, each document region and each page region, and is classified and stored for each directory corresponding to each job region, each document region and each page region. The structure of the relationship file is now described with reference to FIGS. 3 and 4.

Figure 3:
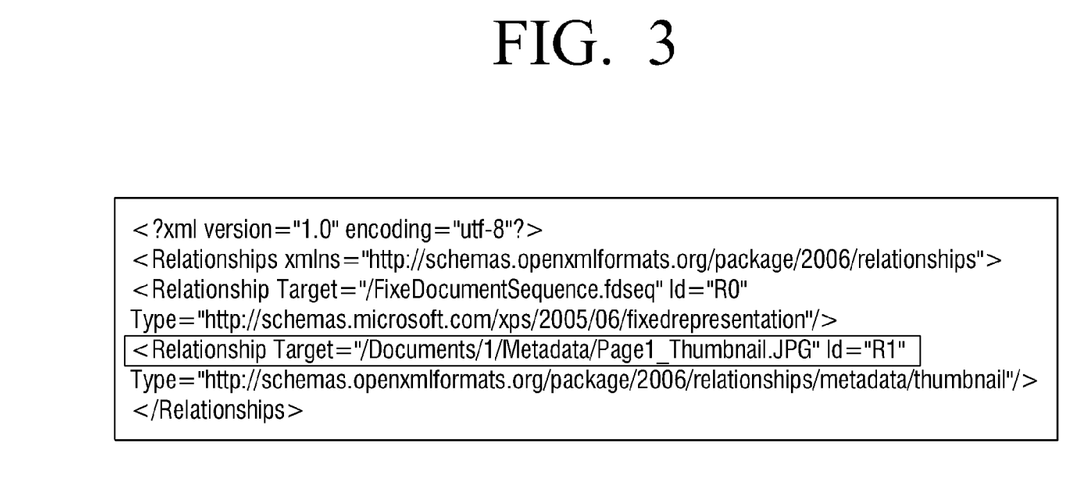
FIGS. 3 and 4 exemplarily illustrate a relationship file structure.
Figure 4:
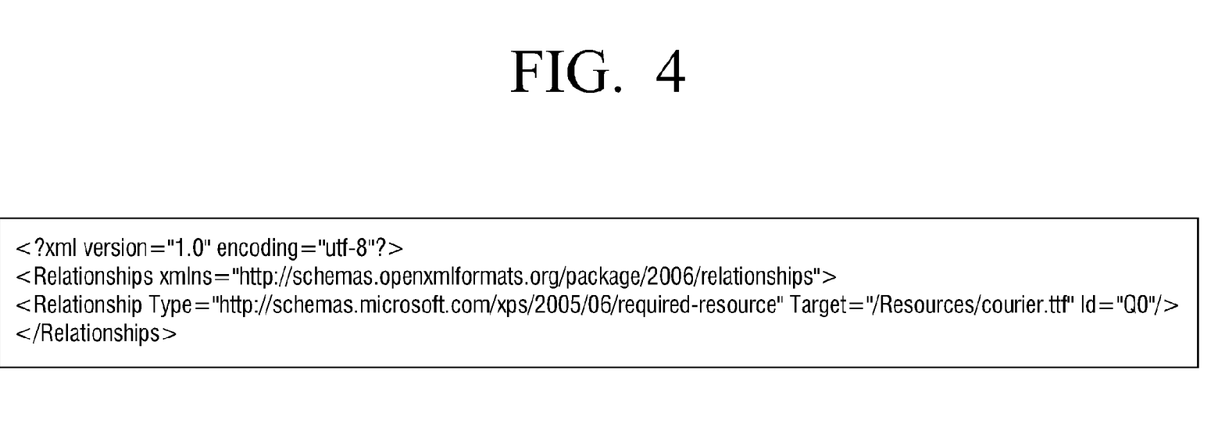

FIG. 3 exemplarily illustrates a structure of a relationship file containing thumbnail information associated with a page region of an XPS file. A thumbnail address 'Page1_Thumbnail.JPG' to indicate the page region is written in a box illustrated in FIG. 3. FIG. 4 exemplarily illustrates a structure of a relationship file associated with a page region of an XPS file. If there is no thumbnail representing the page region, the thumbnail image address illustrated in the box of FIG. 3 is not written in the relation file of FIG. 4. Alternatively, if there is a thumbnail representing the page region, the thumbnail image address illustrated in the box of FIG. 3 may be written in the relation file of FIG. 4.

Figure 5:
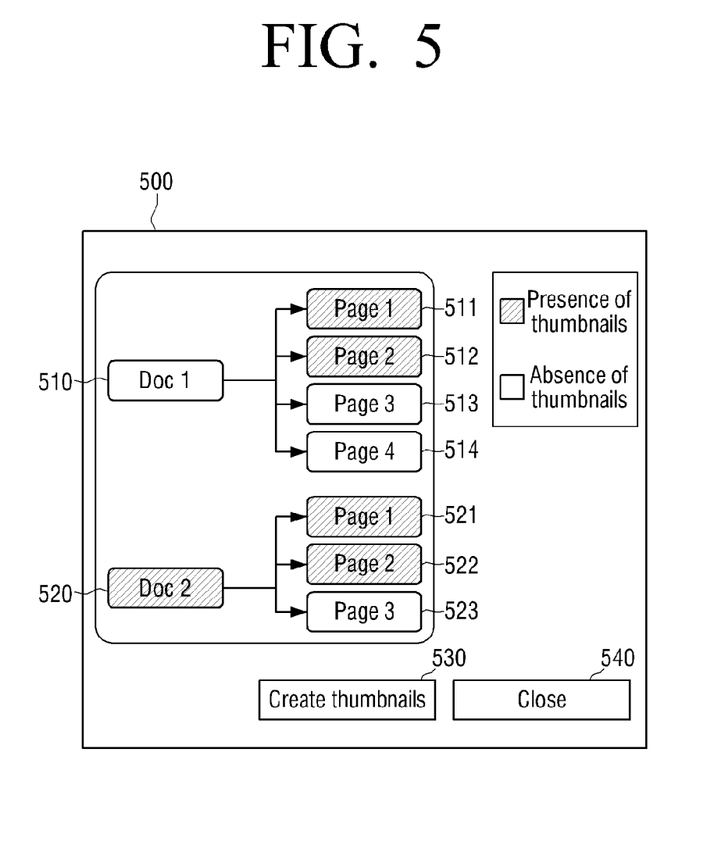
FIGS. 5 to 7 exemplarily illustrate various user interface windows to be displayed on the image forming apparatus of FIG. 2 according to exemplary embodiments of the present general inventive concept.

Referring to FIG. 2, the analyzer 140 determines whether or not thumbnail addresses are written in relationship files associated with each job region, each document region and each page region, to check whether or not thumbnails exist in each job region, each document region or each page region and to acquire thumbnail information such as a thumbnail address of each region. Additionally, the analyzer 140 analyzes a hierarchical branching structure of thumbnails in the XPS file using the acquired thumbnail information. The analyzed thumbnail structure may correspond to the structure of the XPS file as illustrated in FIG. 5, or may include a list of thumbnails.

The analyzer 140 checks one or more resource directories containing thumbnail images in the XPS file to determine whether or not thumbnails exist in each job region, each document region or each page region. In more detail, thumbnail images in the XPS file are stored in resource folders corresponding to each region (e.g., job regions, document regions, or page regions), and the analyzer 140 may thus check each resource folder in the XPS file to determine presence or absence of thumbnails according to whether or not thumbnail images are stored in each resource folder.

The thumbnail creator 150 creates a thumbnail based at least in part on the analyzed structure of the XPS file. Specifically, when there is no thumbnail in the XPS file, the thumbnail creator 150 may create thumbnail images for all regions of the XPS file based on the analyzed structure of the XPS file. Additionally, the thumbnail creator 150 may control the user interface 120 via the controller 160 to display the analyzed structure of the XPS file in order for a user to select one of regions in which there is no thumbnail, and may create a thumbnail image for the selected region. For example, the thumbnail creator may create a thumbnail image for only the user selected region. The analyzed structure of the XPS file may be displayed on a user interface window, which will be described later with reference to FIGS. 5 to 7.

The thumbnail creator 150 may parse print data corresponding to the region selected by the user or corresponding to one or more of the regions in which there is no thumbnail, and renders the parsed data to create thumbnail images. For example, the thumbnail creator 150 may parse print data corresponding to all of the regions in which there is no thumbnail, whether they are selected by the user or not. Alternatively, when an XPS file is currently printed or has been completely printed, if the rendered data (e.g., which may include but is not limited to meta data) exists, the thumbnail creator 150 may create a thumbnail image using the data rendered during printing of the XPS file.

The size of the created thumbnail image may be approximately 96×96 dot per inch (DPI), or may be previously set, or may be any other suitable size. If one or more thumbnail images exist in at least one region of the XPS file, the size of the created thumbnail image may be set using the size of existing thumbnail images. Additionally, the created thumbnail image may be a miniature view of a corresponding document or page. The size of the created thumbnail image may be preset to be a value most suitable for the image forming apparatus 100 by a designer or a user. Accordingly, the thumbnail creator 150 may reduce the rendered data or print data to a predetermined size to create a thumbnail image.

The controller 160 adds the created thumbnail image to the XPS file. In more detail, the controller 160 may add the created thumbnail image to a resource folder corresponding to the created thumbnail image, and may also add the thumbnail information stored in the relationship file associated with each job region, each document region and each page region. In this situation, the controller 160 may set a default thumbnail according to a preset order, or set a thumbnail for a job region, document region or page region selected by the user to be a default thumbnail. For example, when a user searches for a desired XPS file using a search window in preview mode, a single thumbnail may be displayed as a default thumbnail for the XPS file. Accordingly, the controller 160 may set one of the thumbnails in the XPS file to be a default thumbnail according to the preset order, or set a thumbnail selected by the user from among the thumbnails in the XPS file to be a default thumbnail, or the controller 160 may randomly select and set one of the thumbnails in the XPS file to be a default thumbnail.

Additionally, the controller 160 stores an XPS file to which the created thumbnail is added in the storage unit 130. In this situation, the controller 160 may replace the name of the XPS file containing the created thumbnail with a name different from the original XPS file, or may override the original XPS file. Alternatively, the controller 160 may replace the original XPS file with a new file containing the created thumbnail, where the original XPS filename is maintained. Such the operation may be performed according to user selection or automatically performed without any user command.

The controller 160 transmits the stored XPS file to a terminal device (not illustrated). In more detail, after the image forming apparatus 100 receives an XPS file from the terminal device and processes the received XPS file by the above-described operations, the terminal device may use the XPS file containing the created thumbnail, and accordingly the controller 160 may transmit the XPS file containing the created thumbnail to the terminal device via the communication interface 110. The XPS file stored in the storage unit 130 may be transmitted with the name of the original XPS file or with a new name. This operation may be performed according to user selection or automatically performed without any user command.

If a thumbnail creation command for the XPS file is received via the user interface 120 or the communication interface 110, the controller 160 controls the process as described above to be performed. Additionally, if an XPS file print command is received via the user interface 120 or the communication interface 110, the controller 160 also controls the same process as described above to be performed. In more detail, if a command to print an XPS file prestored (e.g., an XPS file stored in the storage unit 130) in the image forming apparatus 100 is received, or if a command to print an XPS file received from a terminal device (not illustrated) is received, the controller 160 may control performing the thumbnail adding operation, as described above.

For example, if a command to print an XPS file prestored in the storage unit 130 of the image forming apparatus 100 is received, the controller 160 may analyze the structure of the prestored XPS file. After analyzing, if it is determined that there is no thumbnail in the entire XPS file, or in one or more regions of the XPS file, or in one or more regions selected by the user of the XPS file, the controller 160 may control the user interface 120 to notify a user of the absence of thumbnails. The controller 160 may control the user interface 120 to generate a user interface window, which includes a first field to display whether or not thumbnails exist for each job region, each document region and each page region in the XPS file and a second field to receive a selection of whether or not to create thumbnails representing each job region, each document region and each page region. The controller 160 may also control the user interface 120 to generate a user interface window, which includes at least one field to display whether or not thumbnails exist for the one or more user-selected regions.

If a user selects a desired region from among regions of the XPS file, the controller 160 may control the thumbnail creator 150 to create a thumbnail for the region selected by the user. The user may decide whether to add the created thumbnail simultaneously in response to the XPS file print command or after the XPS file has been completely printed.

Additionally, the user may select a level of an XPS file such as a job level (e.g., job level 10 of FIG. 2), a document level (e.g., document level 20 of FIG. 2) or a page level (e.g., page level 30 of FIG. 3), or one or more nodes of an XPS file represented in the form of a tree structure.

Therefore, the image forming apparatus 100 may notify a user of the absence of thumbnails when there is no thumbnail in the entire XPS file, or when there is no thumbnail for a document region and page region of the XPS file, or when there are no thumbnails for one or more user-elected regions of the XPS file, or when there are no thumbnails for one or more predetermined regions of the XPS file. Accordingly, the user may select a desired region of the XPS file and add a thumbnail representing the selected region.

Although an XPS file that is received via the communication interface 110 may be processed in the exemplary embodiments with reference to FIG. 2 and the detailed description above, thumbnail creation and processing of an XPS file is not limited thereto. Accordingly, the present general inventive concept is also applicable when an XPS file is prestored in the storage unit 130 of the image forming apparatus 100 so that a thumbnail is added to the prestored XPS file.

According to the exemplary embodiments described above, the image forming apparatus 100 may include, for example, a terminal device such as a PC, a laptop, a PDA or a digital camera, and an image forming apparatus such as a copier, an inkjet printer, a laser beam printer (LBP) or a multifunctional peripheral (MFP).

FIG. 5 exemplarily illustrates a user interface window 500 to be displayed on an image forming apparatus (e.g., image forming apparatus 100 illustrated in FIG. 2) according to exemplary embodiments of the present general inventive concept.

In FIG. 5, the user interface window 500 includes a field to display a structure of a currently open XPS file, and a field to display whether or not thumbnails exist for each document region and each page region in the XPS file. More specifically, the XPS file may contain thumbnails representing each document region (e.g., one document region may include a first document 510, and another document region may include a second document 520) and representing each page region (e.g., a page region may include a first page 511, a second page 512, a third page 513 and a fourth page 514). The user interface window 500 displays the structure of the currently open XPS file in a tree form, and displays whether or not thumbnails exist in one or more document regions and each page region using a hashed background, or any other suitable visual indicator for a user to distinguish between whether thumbnails exist in one or more regions. FIG. 5 illustrates thumbnails representing a first page 511, a second page 512, a third page 513, and a fourth page 514 of a first document 510. FIG. 5 also illustrates a first page 521, a second page 522, and a third page 523 of a second document 520. The user information window 500 of FIG. 5 illustrates the document regions (e.g., second document 520) and page regions (e.g., the first pages 511 and 521, and the second pages 512 and 522) of the XPS file that have thumbnails present, by a hashed background in the boxes for these items. Therefore, it is possible for the user to know which one or more document regions and page regions contain thumbnails.

The presence of thumbnails may be confirmed by displaying thumbnail images themselves, rather than displaying boxes with the hashed pattern as illustrated in FIG. 5. Additionally, if the user selects the document region or page region displayed on the user interface window 500, a thumbnail image corresponding to the selected region may be magnified and displayed (e.g., within the user interface window 500, or in a separate window, etc.).

The user interface window 500 may include a thumbnail creation field 530 to receive a thumbnail creation command and a close field 540 to receive a command to close the user interface window 500. For example, if the user desires to add a thumbnail to the currently open XPS file, he or she may select the thumbnail creation field 530 so that another user interface window may be displayed which is now described with reference to FIG. 6.

Figure 6:
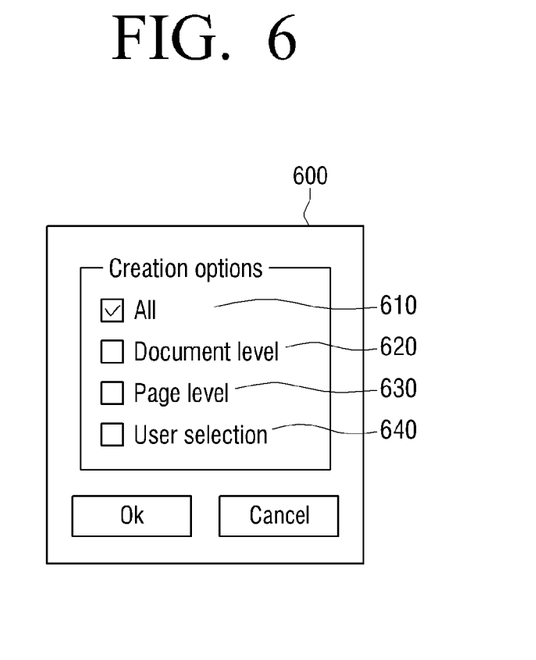

FIG. 6 exemplarily illustrates a user interface window 600 to be displayed when a user selects the thumbnail creation field 530 on the user interface window 500 of FIG. 5.

In FIG. 6, the user interface window 600 displays a creation option window through which a user can select the entire XPS file currently open, or one or more regions of the XPS file to create corresponding thumbnails. The creation option window may include a first option 610 to select the entire XPS file, a second option 620 to select a document level of the XPS file, a third option 630 to select a page level of the XPS file, and a fourth option 640 to allow user selection. Additionally, the user interface window 600 may include an option to select a job level of the XPS file currently open, or may include an option to select another XPS file to be opened, or any other suitable option to create thumbnails.

In more detail, the first option 610 enables creation of thumbnails corresponding to all job regions, document regions and page regions in the XPS file when there is no thumbnail in the XPS file (e.g., the entire XPS file, one or more selected regions of the XPS file, etc.), and the second option 620 enables creation of thumbnails corresponding to the document level in which there is no thumbnail. Additionally, the third option 630 enables creation of thumbnails corresponding to the page level in which there is no thumbnail.

The fourth option 640 enables creation of thumbnails corresponding to regions selected by a user from among job, document and page levels of the XPS file. The fourth option 640 may also enable creation of thumbnails corresponding to another XPS file selected by a user. For example, a user may select a new XPS file, and select to create thumbnails corresponding to one or more regions of the new XPS file, including the job, document, and page levels of the new XPS file. When the user selects the fourth option 640, a user interface window 700 may be displayed as illustrated in FIG. 7.

Figure 7:
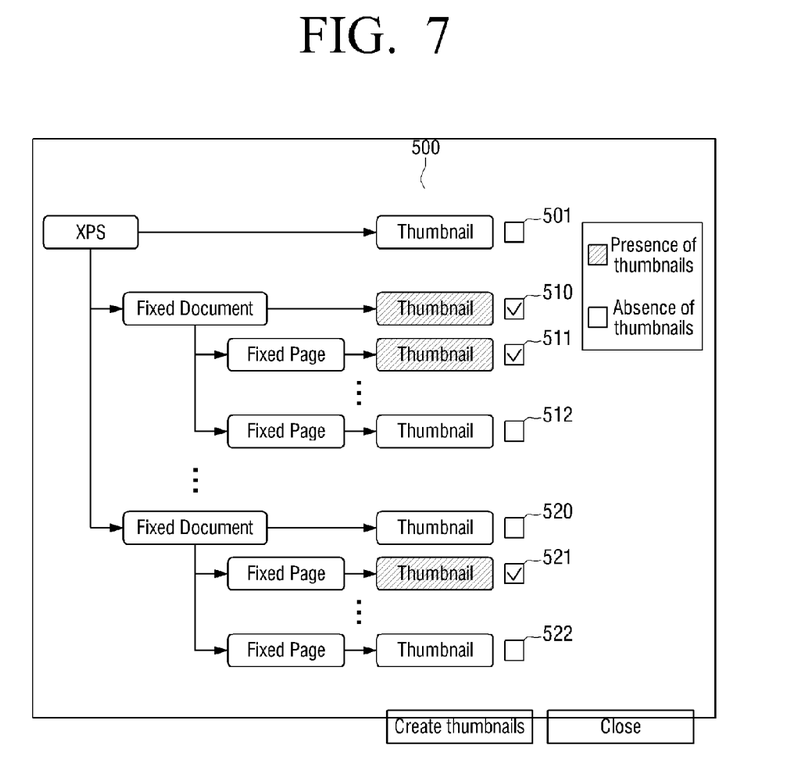

FIG. 7 exemplarily illustrates a user interface window 700 to be displayed when a user selects the fourth option 640 on the user interface window 600 of FIG. 6.

In FIG. 7, the user interface window 700 includes a first field to display whether or not thumbnails exist for each job region, each document region and each page region in an XPS file, and a second field 501 to receive a selection of whether or not to create thumbnails representing each job region, each document region and each page region. As illustrated in FIG. 7, selectable fields may include, for example, selection options for the first document 510, the first page 511 and the second page 512 of the first document 510, the second document 520, and the first page 521 and the second page 522 of the second document 520. For example, if the user selects the fourth option 640 of FIG. 6 in order to create a thumbnail of a predetermined region in the XPS file, the user interface window 700 may appear so that the user may select one or more of job, document and page regions of the XPS file. Since there is no need to additionally create thumbnails for regions to which thumbnails have already been added, boxes indicating these regions are displayed with the hashed pattern, along with selections indicated with a checkmark or other suitable identifier that correspond to the boxes having the hashed patterns as illustrated in FIG. 7. Additionally, the presence of thumbnails may be confirmed by displaying thumbnail images themselves, rather than displaying boxes with the hashed pattern as illustrated in FIG. 7.

Therefore, it is possible for the user to know which regions of the currently open XPS file contain thumbnails, and to select only a desired job region, document region and page region using the displayed user interface window to create a thumbnail corresponding to the selected region, thereby increasing user convenience.

Figure 8:
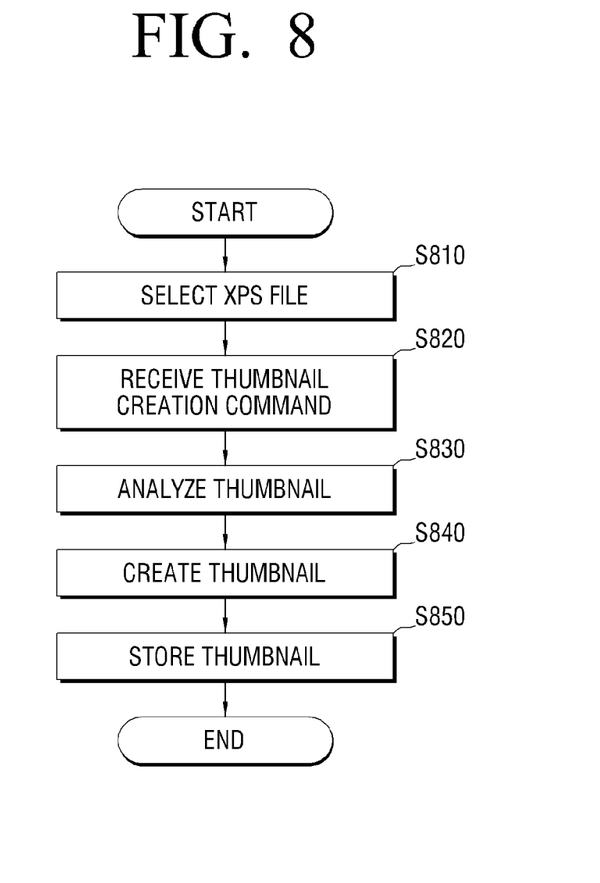
FIG. 8 is a flowchart illustrating a thumbnail creation method according to exemplary embodiments of the present general inventive concept.

FIG. 8 is a flowchart illustrating a thumbnail creation method according to exemplary embodiments of the present general inventive concept.

In FIG. 8, if a user selects a desired XPS file to create a thumbnail for the XPS file in operation S810, and enters a thumbnail creation command for the selected XPS file in operation S820, the structure of the selected XPS file is analyzed in operation S830. In this situation, the thumbnail creation command refers to a command to additionally create thumbnails. In operation S820, the user may enter a command to print the selected XPS file rather than entering the thumbnail creation command. Additionally, in response to the thumbnail creation command, each job region, each document region and each page region in the selected XPS file are analyzed, so that presence or absence of thumbnails in each job region, each document region and each page region may be determined according to whether or not a thumbnail address is written in a relationship file associated with each job region, each document region and each page region, and so that thumbnail information such as a thumbnail address for the existing thumbnail may be acquired. Additionally, a thumbnail structure corresponding to the analyzed structure of the XPS file may also be analyzed using the acquired thumbnail information.

If the structure of the XPS file has been completely analyzed, thumbnails may be created based on the analyzed structure of the XPS file in operation S840. More specifically, data corresponding to regions in which there is no thumbnail image or regions selected by the user may be parsed using the analyzed thumbnail structure and the parsed data may be rendered so that thumbnail images may be created. Operation S840 may be performed in the same manner as the operation of the thumbnail creator 150 described above with reference to FIG. 2.

The created thumbnail is added to the XPS file, and the XPS file to which the thumbnail is added is stored in operation S850. In more detail, the created thumbnail may be added to a corresponding resource folder, and information regarding the created thumbnail may be added to the relationship file associated with each job region, each document region and each page region, so that the created thumbnail may be added to the XPS file and the XPS file to which the thumbnail is added may be stored, for example, in the storage unit 130 illustrated in FIG. 2 and described above. The name of the stored XPS file may be replaced with a name different from the original XPS file, or may be stored by overriding the original XPS file. Such the operation may be performed according to user selection or automatically performed without any user command.

The XPS file stored in operation S850 may be transmitted to the terminal device. In operation S850, a default thumbnail may be set according to the preset order, or a thumbnail corresponding to a job region, document region or page region selected by the user may be set to be a default thumbnail.

Therefore, the thumbnail creation method according to exemplary embodiments of the present general inventive concept may provide a user with information on the absence of thumbnails when there is no thumbnail in an XPS file, so it is possible for the user to easily add thumbnails to the XPS file using the provided information. The thumbnail creation method of FIG. 8 may be performed by the image forming apparatus 100 configured as illustrated in FIG. 2, and may also be performed by image forming apparatuses other than the image forming apparatus 100 or by a terminal device.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although several embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A thumbnail creation method comprising:
    receiving a selection of an XML paper specification (XPS) file;
    analyzing a structure of the XPS file to determine a presence or absence of thumbnails in each region of the XPS file by analyzing a structure of a job region, a document region and a page region in the XPS file, and checking whether thumbnail information is contained in the job region, the document region and the page region;
    creating a new thumbnail image representing the XPS file according to the analyzed structure; and
    adding the newly created thumbnail image to at least one region of the XPS file where there is an analyzed absence of thumbnails.

2. The thumbnail creation method of claim 1, wherein the receiving of the selection of the XPS file comprises:
    determining that the XPS file is selected when at least one of an XPS file print command and a thumbnail creation command is received.

3. The thumbnail creation method of claim 1, further comprising:
    displaying a notification that there is no thumbnail information when the XPS file does not contain thumbnail information.

4. The thumbnail creation method of claim 3, wherein the displaying of the notification comprises:
    displaying the notification that there is no thumbnail information with a user interface window having a first field to display whether or not thumbnails exist for the job region, the document region and the page region in the XPS file, and a second field to receive a selection of whether to create thumbnails respectively representing the job region, the document region and the page region.

5. The thumbnail creation method of claim 4, wherein the creating of the thumbnail image comprises:
    creating a thumbnail image representing a region from a received selection.

6. The thumbnail creation method of claim 1, wherein the creating of the thumbnail image comprises:
    creating at least one thumbnail image representing at least one of all regions of the XPS file, all document regions of the XPS file and all page regions of the XPS file.

7. The thumbnail creation method of claim 1, wherein the creating of the thumbnail image comprises:
    creating a thumbnail image using rendered data corresponding to a document region and a page region represented by the thumbnail image or print data corresponding to the document region and page region represented by the thumbnail image.

8. The thumbnail creation method of claim 7, wherein the creating of the thumbnail image comprises:
    reducing the rendered data or the print data to a predetermined size and creating a thumbnail image.

9. The thumbnail creation method of claim 1, further comprising:
    storing the XPS file to which the thumbnail image is added.

10. An image forming apparatus comprising:
    a user interface including a display to receive a selection of an XML paper specification (XPS) file;
    an analyzer to analyze a structure of the XPS file to determine a presence or absence of thumbnails in each region of the XPS file, the analyzer to analyze a structure of a job region, a document region and a page region in the XPS file, and to check whether thumbnail information is contained in the job region, the document region and the page region;
    a thumbnail creator to create a new thumbnail image representing the XPS file according to the analyzed structure; and
    a controller to add the newly created thumbnail image to at least one region of the XPS file where there is an analyzed absence of thumbnails.

11. The image forming apparatus of claim 10, wherein the user interface determines that the XPS file is selected when at least one of an XPS file print command and a thumbnail creation command is received.

12. The image forming apparatus of claim 10, wherein the user interface displays a notification on the display that there is no thumbnail information when the XPS file does not contain thumbnail information.

13. The image forming apparatus of claim 12, wherein the user interface displays the notification on the display that there is no thumbnail information with a user interface window having a first field to display whether or not thumbnails exist for the job region, the document region and the page region in the XPS file, and a second field to receive a selection of whether to create thumbnails respectively representing the job region, the document region and the page region.

14. The image forming apparatus of claim 13, wherein the thumbnail creator creates a thumbnail image representing a region from a received selection.

15. The image forming apparatus of claim 10, wherein the thumbnail creator creates at least one thumbnail image representing at least one of all regions of the XPS file, all document regions of the XPS file and all page regions of the XPS file.

16. The image forming apparatus of claim 10, wherein the thumbnail creator creates a thumbnail image using rendered data corresponding to a document region and a page region represented by the thumbnail image or print data corresponding to the document region and page region represented by the thumbnail image.

17. The image forming apparatus of claim 16, wherein the thumbnail creator reduces the rendered data or the print data to a predetermined size and creates a thumbnail image.

18. The image forming apparatus of claim 10, further comprising:
a storage unit to store the XPS file to which the thumbnail image is added.

19. The image forming apparatus of claim 10, further comprising:
a communication interface to transmit the XPS file to which the thumbnail image is added.

20. A thumbnail creation method comprising:
receiving a selection of an XML paper specification (XPS) file;
receiving a thumbnail creation command;
analyzing a structure of the XPS file and determining a presence or absence of thumbnails in each region of the XPS file by analyzing a structure of a job region, a document region and a page region in the XPS file, and checking whether thumbnail information is contained in the job region, the document region and the page region;
creating a new thumbnail image representing the XPS file according to the analyzed structure and the thumbnail creation command;
adding the newly created thumbnail image to at least one region of the XPS file where there is an analyzed absence of thumbnails; and
storing the XPS file to which the thumbnail image is added.

21. An image forming apparatus, comprising:
a user interface including a display to receive a selection of an XML paper specification (XPS) file and a thumbnail creation command;
an analyzer to analyze a structure of the XPS file and to determine a presence or absence of thumbnails in each region of the XPS file, the analyzer to analyze a structure of a job region, a document region and a page region in the XPS file, and to check whether thumbnail information is contained in the job region, the document region and the page region;
a thumbnail creator to create a new thumbnail image representing the XPS file according to the analyzed structure and the received thumbnail creation command;
a controller to add the newly created thumbnail image to at least one region of the XPS file where there is an analyzed absence of thumbnails;
a communication interface to transmit the XPS file having the added thumbnail image; and
a digital storage device to store the XPS file to which the thumbnail image is added.

* * * * *